US012309107B2

(12) United States Patent
Kumar et al.

(10) Patent No.: US 12,309,107 B2
(45) Date of Patent: May 20, 2025

(54) SYSTEMS AND METHODS FOR RECEIVING, TRANSFORMING, AND ROUTING MESSAGES IN REAL TIME

(71) Applicant: JPMORGAN CHASE BANK, N.A., New York, NY (US)

(72) Inventors: Pavan Kumar, Christchurch (GB); Madhu Bangalore, Bournemouth (GB); Lawrence Charles Drake, Bournemouth (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/449,818

(22) Filed: Aug. 15, 2023

(65) Prior Publication Data

US 2025/0063007 A1 Feb. 20, 2025

(51) Int. Cl.
*H04L 51/046* (2022.01)
*G06Q 40/02* (2023.01)
*H04L 51/066* (2022.01)

(52) U.S. Cl.
CPC ........... *H04L 51/046* (2013.01); *G06Q 40/02* (2013.01); *H04L 51/066* (2013.01)

(58) Field of Classification Search
CPC ...... H04L 51/046; H04L 51/066; G06Q 40/02
See application file for complete search history.

(56) References Cited

U.S. PATENT DOCUMENTS

| | | | | |
|---|---|---|---|---|
| 10,572,951 B1* | 2/2020 | Hecht | ............... | G06Q 40/12 |
| 11,341,582 B1* | 5/2022 | Hecht | ............... | G06Q 40/00 |
| 11,615,413 B2* | 3/2023 | Bellamy | ............... | G06Q 20/02 |
| | | | | 705/44 |
| 11,842,389 B2* | 12/2023 | San Martin | ............. | G06F 9/451 |
| 11,971,862 B1* | 4/2024 | Han | ............... | G06Q 20/401 |
| 12,008,564 B2* | 6/2024 | Bellamy | ............... | G06Q 20/02 |
| 2022/0052853 A1* | 2/2022 | Le Calvez | ............. | H04L 9/3247 |
| 2022/0391892 A1* | 12/2022 | Wied | ............... | G06F 16/2308 |
| 2023/0153894 A1* | 5/2023 | Sharma | ............... | G06Q 20/14 |
| | | | | 705/26.82 |
| 2024/0135344 A1* | 4/2024 | Pandey | ............... | G06Q 20/102 |
| 2024/0232832 A9* | 7/2024 | Pandey | ............... | G06Q 20/108 |

* cited by examiner

*Primary Examiner* — David R Lazaro
(74) *Attorney, Agent, or Firm* — GREENBERG TRAURIG LLP

(57) ABSTRACT

A method may include: a processing application receiving an instruction, identifying a destination ledgering platform for the instruction, re-formatting, the instruction to generate a posting, and routing the posting to a messaging ingestion platform; a messaging ingestion platform program routing, the posting to the destination ledgering platform, wherein the destination ledgering platform is configured to consume the posting, update appropriate account balances, and publish the posting and the account balances to a messaging queue; a messaging consumption platform computer program receiving the posting and the account balances from the messaging queue, dynamically consuming the posting, retrieving a consumer profile, re-formatting the posting based on the consumer profile, generating a new message for the re-formatted posting, and publishing the new message to a messaging queue, wherein a consuming application is configured to consume the new message.

15 Claims, 3 Drawing Sheets

SYSTEMS AND METHODS FOR RECEIVING, TRANSFORMING, AND ROUTING MESSAGES IN REAL TIME

BACKGROUND OF THE INVENTION

1. Field of the Invention

Embodiments relate generally to systems and methods for receiving, transforming, and routing messages in real time.

2. Description of the Related Art

The lack of real-time intraday services for accounts, such as demand deposit accounts (DDAs) has resulted in the proliferation of systems across client reporting, corporate treasury and credit management that derive intraday balances from non-confirmed sources. This can lead to inaccurate information.

SUMMARY OF THE INVENTION

Systems and methods for receiving, transforming, and routing messages in real time are disclosed. According to an embodiment, a method for receiving, transforming, and routing messages in real time may include: (1) receiving, by a processing application via a supported channel, an instruction; (2) identifying, by the processing application, a destination ledgering platform for the instruction; (3) re-formatting, by the processing application, the instruction to generate a posting; (4) routing, by the processing application, the posting to a messaging ingestion platform; (5) routing, by a messaging ingestion platform program, the posting to the destination ledgering platform, wherein the destination ledgering platform is configured to consume the posting, update appropriate account balances, and publish the posting and the account balances to a messaging queue; (6) receiving, by a messaging consumption platform computer program, the posting and the account balances from the messaging queue; (7) dynamically consuming, by the messaging consumption platform computer program, the posting; (8) retrieving, by the messaging consumption platform computer program, a consumer profile; (9) re-formatting, by the messaging consumption platform computer program, the posting based on the consumer profile; (10) generating, by the messaging consumption platform computer program, a new message for the re-formatted posting; and (11) publishing, by the messaging consumption platform computer program, the new message to a messaging queue, wherein a consuming application is configured to consume the new message.

In one embodiment, the processing application re-formats the instruction to generate posting that are sourced from payment engines or foreign exchange systems.

In one embodiment, the posting comprise a hold or a general ledger movement.

In one embodiment, the destination ledgering platform is identified based on a source system or a legal entity.

In one embodiment, the consumer profile identifies a format for the posting.

In one embodiment, the consumer profile stores attributes to support consumption by the destination ledgering platform.

According to another embodiment, a non-transitory computer readable storage medium, may include instructions stored thereon, which when read and executed by one or more computer processors, cause the one or more computer processors to perform steps comprising: receiving an instruction; identifying a destination ledgering platform for the instruction; re-formatting the instruction to generate a posting; routing the posting to a messaging ingestion platform; routing the posting to the destination ledgering platform; consuming the posting and updating account balances; publishing the posting and the account balances to a messaging queue; receiving the posting and the account balances from the messaging queue; dynamically consuming the posting; retrieving a consumer profile; re-formatting the posting based on the consumer profile; generating a new message for the re-formatted posting; and publishing the new message to a messaging queue, wherein a consuming application consumes the new message.

In one embodiment, the instruction is re-formatted based on payment engines or foreign exchange systems.

In one embodiment, the posting comprise a hold or a general ledger movement.

In one embodiment, the destination ledgering platform is identified based on a source system or a legal entity.

In one embodiment, the consumer profile identifies a format for the posting.

In one embodiment, the consumer profile stores attributes to support consumption by the destination ledgering platform.

According to another embodiment, a system may include a plurality of processing platforms; a messaging ingestion platform; a ledgering platform comprising a plurality of ledgers; a messaging consumption platform; and a plurality of consumer applications. One of the processing platforms is configured to receive an instruction via a supported channel, to identify a destination ledgering platform for the instruction, to re-format the instruction to generate a posting, and to route the postings to a messaging ingestion platform; the messaging ingestion platform is configured to route the posting to one of the plurality of ledgers in the ledgering platform; the ledger is configured to consume the posting, update account balances, and publish the posting and the account balances to a messaging queue; the messaging consumption platform computer program is configured to receive the posting and the account balances from the messaging queue, dynamically consume the posting, retrieve a consumer profile, re-format the posting based on the consumer profile, generate a new message for the re-formatted posting, and publish the new message to a messaging queue; one of the consuming applications is configured to consume the new message.

In one embodiment, the processing application is configured to re-format the instruction to generate postings that are sourced from payment engines or foreign exchange systems.

In one embodiment, the postings comprise a hold or a general ledger movement.

In one embodiment, the destination ledger is identified based on a source system or a legal entity.

In one embodiment, the consumer profile identifies a format for the posting.

In one embodiment, the consumer profile stores attributes to support consumption by the destination ledgering platform.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are generally directed to systems and methods for receiving, transforming, and routing messages in real time.

Embodiments enabling a shift from batch end of day to intraday cash management/reconciliation and liquidity control. Embodiments may provision accurate, real-time position and balance information. Accurate real-time data enables intraday balances and payment flows to be reported by client and account in order to determine the intraday utilization of liquidity in real-time. This reduces operating risk.

Embodiments may deliver confirmed intraday cash postings and account related information from Demand Deposit Accounts (DDAs) to the consumers of this data, within the bank for onward presentation/use. Postings may be confirmed, verified, and qualified quickly, hence providing more accurate information.

Embodiments reduce credit risk and eliminate client reporting errors from the reports that do not reflect confirmed postings.

Figure 1:
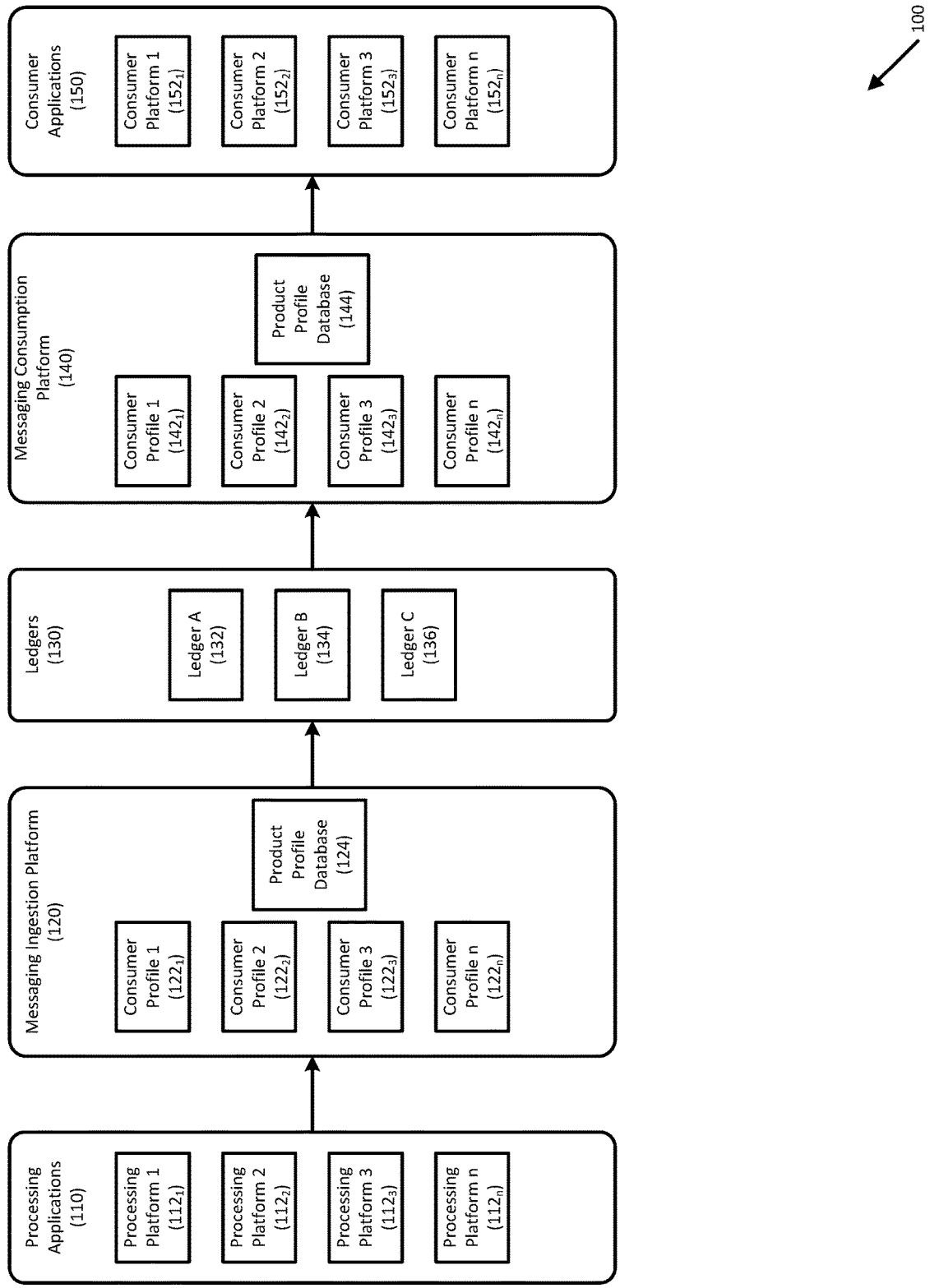
FIG. 1 depicts a system for receiving, transforming, and routing messages in real time according to an embodiment.

Referring to FIG. 1, a system for receiving, transforming, and routing messages in real time is provided according to an embodiment. System 100 may include a plurality of processing platforms 112 (e.g., processing platform 1 $112_1$, processing platform 2 $112_2$, processing platform 3 $112_3$, . . . processing platform n $112_n$) hosted by processing applications 110. Processing platforms 112 may provide messages, such as a payment instruction, over a supported channel (not shown), such as SWIFT, a portal, etc. Examples of processing platforms 112 may include payment engines for high and low value, foreign exchange contracts, loans, cheques, etc.

System 100 may further include messaging ingestion platform 120 that may perform posting, holds, general ledger movements, etc. Messaging ingestion platform 120 may include a plurality of consumer profiles 122 (e.g., consumer profile 1 $122_1$, consumer profile 2 $122_2$, consumer profile 3 $122_3$, . . . consumer profile n $122_n$). Consumer profiles 122 may store information about a message consumer, such as a processing system name for which the consumer will be processing. For example, processing platforms 112 may be further sub-divided into, for example, high, low, and real-time flows. Each flow may be provided a name, such as "EMEA High Value Payments," "APAC Low Value Payment," "U.S. Real-time Payment," etc. These may be used to support the consumer profile ingestion processing.

Messaging ingestion platform 120 may further include product profile database 124, which may store, for example, postings, holds, and general ledger movements. The product profiles may include product-specific rules that may be used to support routing/processing logic. For example, the rules may be used for duplicate checks, operational purposes (e.g., replay, ack/nack processing, etc.), etc. Examples of products may include posting or movements against accounts, holds, payment instructions, etc.

System 100 may interface with ledgers 130, including ledger A 132, ledger B 134, and ledger C 136. Although three ledgers are illustrated, it should be recognized that a greater number or a fewer number of ledgers may be interfaced with. Ledgers 130 may store postings, holds, general ledger movements, and resulting calculated balance. Different ledgering patterns/technologies/use cases are supported by different ledger platforms.

Messaging consumption platform 140 may consume messages published by ledgers 130. In one embodiment, consumer profiles 142 (e.g., consumer profile 1 $142_1$, consumer profile 2 $142_2$, consumer profile 3 $142_3$, . . . consumer profile n $142_n$) may consume the messages from processing applications 112 or ledgers 130, and may validate, process, and persist the messages in product profile database 144. Product profile database may store the messages supporting further validation, and may publish the messages to consumer applications 150.

Consumer applications 150 may host, for example, consumer platforms 152 (e.g., consumer platform 1 $152_1$, consumer platform 2 $152_2$, consumer platform 3 $152_3$, . . . consumer platform n $152_n$). Consumer platforms 152 may include, for example, reconciliation platforms, regulatory platforms, and client reporting platforms. These consumer platforms 152 may further process posting information and may reformat before providing to the client and other internal stakeholders.

Figure 2:
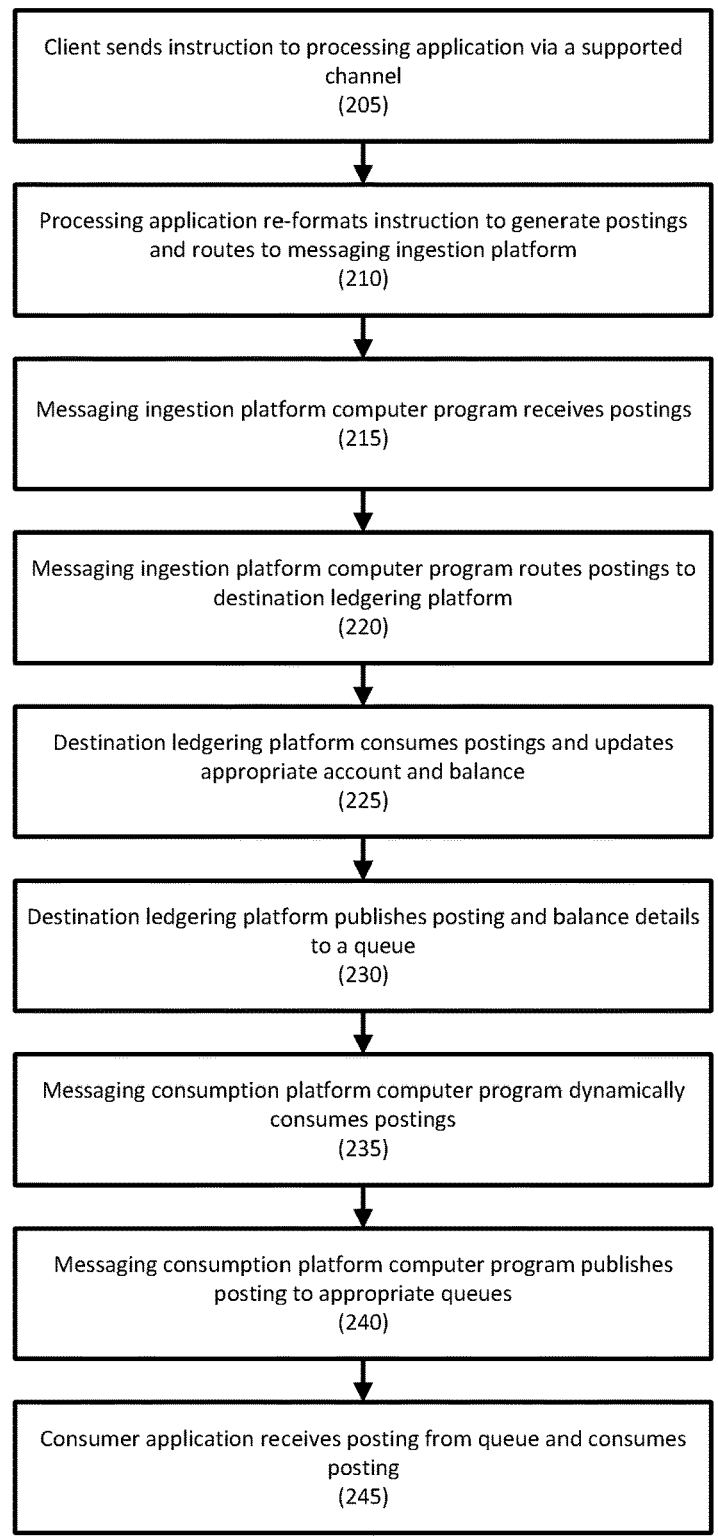
FIG. 2 depicts a method for receiving, transforming, and routing messages in real time according to an embodiment.

Referring to FIG. 2, a method for receiving, transforming, and routing messages in real time is provided according to an embodiment.

In step 205, a client may send an instruction, such as a payment, to a processing application via a supported channel. In one embodiment, the instruction may include a SWIFT message or payment API that includes payment instruction information requesting a financial institution to process and settle payment movement from the client's bank account.

In step 210, the processing application may receive the instruction and may re-format the instruction to generate postings. Postings may be sourced from payment engines, foreign exchange systems, cheques, etc. The processing application may generate the posting based on the requirements for the product. The result is a posting, a hold, and/or a general ledger movement.

The processing application may communicate the re-formatted posting to the messaging ingestion platform.

In step 215, the messaging ingestion platform may receive the posting from the processing application, and, in step 220, may route the posting to a destination ledgering platform. The destination ledger platform may be identified based on any suitable criteria, including one or more of a source system, a legal entity, etc.

For example, the messaging ingestion platform may identify and retrieve a consumer profile for a consumer platform. The consumer profile may be used to identify the processing application/platform to process the posting, hold, GL movement, etc. It may also hold details on what format the incoming message is using, and may also be used to store appropriate attributes to support consumption by one or more destination ledger.

The consumer profile may be based on the processing application that is sending the message and an agreed message contract. In one embodiment, the agreed message contract may be set during onboarding.

In one embodiment, the messaging ingestion platform may retrieve a product profile from product profile database.

Products may include, for example, posting or movements against accounts, holds, payment instructions, etc.

In step 225, the destination ledgering platform may consume the posting (e.g., holds, general ledger movements, etc.) and may update appropriate account balances.

In step 230, the destination ledgering platform may publish postings and balance details to a messaging queue. For example, the destination ledgering platform may update the incoming message and may publish the updated message to the messaging queue. For balances, the destination ledger may generate and publish the balance details to the messaging queue.

In step 235, a messaging consumption platform computer program may dynamically consume postings from the destination ledgering platform. Depending on the capability, the messaging consumption platform may reformat the message before using it to generate further messages such as client reporting.

In one embodiment, the messaging consumption platform may retrieve a consumer profile for the message. The messaging consumption platform may reformat the published message to confirm the consumer format. In one embodiment, the messaging consumption platform may use a pre-agreed communication contract to send messages; in another embodiment, the messaging consumption platform may generate messages based on any consumer requirements/message formats.

In one embodiment, the messaging consumption platform may retrieve a product profile from product profile database.

In one embodiment, the message consumption platform may generate messages from the incoming posting in different formats and may publish the message to one or more consumer applications.

In step 240, the messaging consumption platform computer program may publish the postings received from one or more ledger to appropriate queues. The messaging consumption platform may also format the posting, filter, and publish the posting.

In step 245, a consumer application may receive the posting from the queue and may consume the posting.

Figure 3:
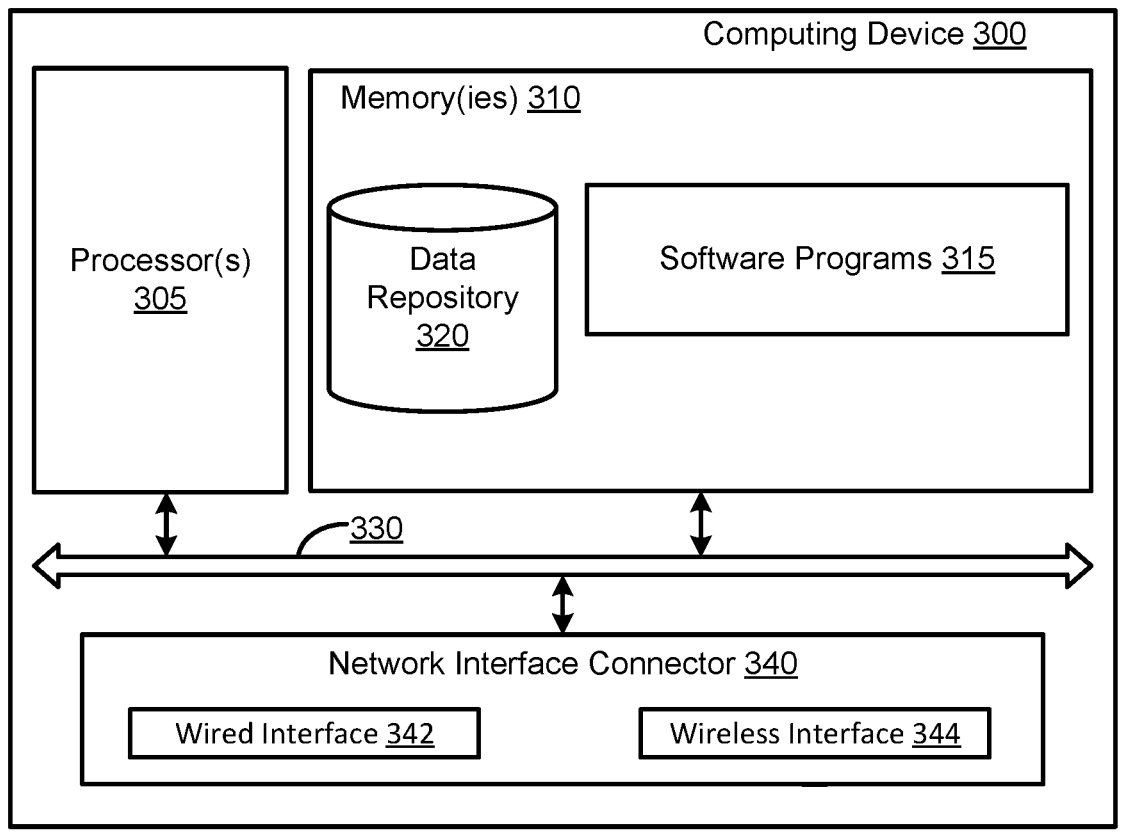
FIG. 3 depicts an exemplary computing system for implementing aspects of the present disclosure.

FIG. 3 depicts an exemplary computing system for implementing aspects of the present disclosure. FIG. 3 depicts exemplary computing device 300. Computing device 300 may represent the system components described herein. Computing device 300 may include processor 305 that may be coupled to memory 310. Memory 310 may include volatile memory. Processor 305 may execute computer-executable program code stored in memory 310, such as software programs 315. Software programs 315 may include one or more of the logical steps disclosed herein as a programmatic instruction, which may be executed by processor 305. Memory 310 may also include data repository 320, which may be nonvolatile memory for data persistence. Processor 305 and memory 310 may be coupled by bus 330. Bus 330 may also be coupled to one or more network interface connectors 340, such as wired network interface 342 or wireless network interface 344. Computing device 300 may also have user interface components, such as a screen for displaying graphical user interfaces and receiving input from the user, a mouse, a keyboard and/or other input/output components (not shown).

Although multiple embodiments have been described, it should be recognized that these embodiments are not exclusive to each other, and that features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:
receiving, by a processing application via a supported channel, an instruction;
identifying, by the processing application, a destination ledgering platform for the instruction;
re-formatting, by the processing application, the instruction to generate a posting, wherein the postings comprise an account posting, an account hold, and/or an account general ledger movement;
routing, by the processing application, the posting to a messaging ingestion platform;
routing, by a messaging ingestion platform program, the posting to the destination ledgering platform, wherein the destination ledgering platform is configured to consume the posting, update appropriate account balances, and publish the posting and the account balances to a messaging queue;
receiving, by a messaging consumption platform computer program, the posting and the account balances from the messaging queue;
dynamically consuming, by the messaging consumption platform computer program, the posting;
retrieving, by the messaging consumption platform computer program, a consumer profile for a consumer of the posting, wherein the consumer profile specifies a posting format for the consumer;
re-formatting, by the messaging consumption platform computer program, the posting based on the consumer profile;
generating, by the messaging consumption platform computer program, a new message for the re-formatted posting; and
publishing, by the messaging consumption platform computer program, the new message to a messaging queue, wherein a consuming application is configured to consume the new message.

2. The method of claim 1, wherein the processing application re-formats the instruction to generate posting that are sourced from payment engines or foreign exchange systems.

3. The method of claim 1, wherein the destination ledgering platform is identified based on a source system or a legal entity.

4. The method of claim 1, wherein the consumer profile stores attributes to support consumption by the destination ledgering platform.

5. The method of claim 1, wherein the postings are sourced from a payment engine and/or a foreign exchange system.

6. A non-transitory computer readable storage medium, including instructions stored thereon, which when read and executed by one or more computer processors, cause the one or more computer processors to perform steps comprising:
receiving an instruction;
identifying a destination ledgering platform for the instruction;
re-formatting the instruction to generate a posting, wherein the postings comprise an account posting, an account hold, and/or an account general ledger movement;
routing the posting to a messaging ingestion platform;
routing the posting to the destination ledgering platform;
consuming the posting and updating account balances;
publishing the posting and the account balances to a messaging queue;
receiving the posting and the account balances from the messaging queue;
dynamically consuming the posting;
retrieving a consumer profile for a consumer of the posting, wherein the consumer profile specifies a posting format for the consumer;
re-formatting the posting based on the consumer profile;
generating a new message for the re-formatted posting; and
publishing the new message to a messaging queue, wherein a consuming application consumes the new message.

7. The non-transitory computer readable storage medium of claim 6, wherein the instruction is re-formatted based on payment engines or foreign exchange systems.

8. The non-transitory computer readable storage medium of claim 6, wherein the destination ledgering platform is identified based on a source system or a legal entity.

9. The non-transitory computer readable storage medium of claim 6, wherein the consumer profile stores attributes to support consumption by the destination ledgering platform.

10. The non-transitory computer readable storage medium of claim 6, wherein the postings are sourced from a payment engine and/or a foreign exchange system.

11. A system, comprising:
a plurality of processing platforms;
a messaging ingestion platform;
a ledgering platform comprising a plurality of ledgers;
a messaging consumption platform; and
a plurality of consuming applications;
wherein:
one of the processing platforms is configured to receive an instruction via a supported channel, to identify a destination ledgering platform for the instruction, to re-format the instruction to generate a posting, wherein the postings comprise an account posting, an account hold, and/or an account general ledger movement, and to route the postings to a messaging ingestion platform;
the messaging ingestion platform is configured to route the posting to one of the plurality of ledgers in the ledgering platform;
the ledger is configured to consume the posting, update account balances, and publish the posting and the account balances to a messaging queue;
the messaging consumption platform is configured to receive the posting and the account balances from the messaging queue, dynamically consume the posting, retrieve a consumer profile for a consumer of the posting, wherein the consumer profile specifies a posting format for the consumer, re-format the posting based on the consumer profile, generate a new message for the re-formatted posting, and publish the new message to a messaging queue;
one of the consuming applications is configured to consume the new message.

12. The system of claim 11, wherein the processing platform is configured to re-format the instruction to generate postings that are sourced from payment engines or foreign exchange systems.

13. The system of claim 11, wherein the destination ledgering platform is identified based on a source system or a legal entity.

14. The system of claim 11, wherein the consumer profile stores attributes to support consumption by the destination ledgering platform.

15. The system of claim 11, wherein the postings are sourced from a payment engine and/or a foreign exchange system.

* * * * *